United States Patent [19]

Leeper

[11] 4,324,282
[45] Apr. 13, 1982

[54] TIRE CHANGING APPARATUS

[75] Inventor: Charles G. Leeper, Antioch, Tenn.

[73] Assignee: Hennessy Industries, Inc., Elk Grove Village, Ill.

[21] Appl. No.: 134,305

[22] Filed: Mar. 26, 1980

[51] Int. Cl.³ .............................................. B60C 25/08
[52] U.S. Cl. .................................................. 157/1.22
[58] Field of Search .................... 157/1.22, 1.24, 1.28, 157/18

[56] References Cited

U.S. PATENT DOCUMENTS

| | | | |
|---|---|---|---|
| 2,812,788 | 11/1957 | Athmann | 157/18 |
| 2,948,314 | 8/1960 | Bishman | 157/18 |
| 3,168,130 | 2/1965 | Turpin | 157/1.28 |
| 3,717,193 | 2/1973 | Craft | 157/1.24 X |
| 3,905,413 | 9/1975 | Myers | 157/1.24 |

Primary Examiner—James G. Smith
Attorney, Agent, or Firm—Wegner, Stellman, McCord, Wood & Dalton

[57] ABSTRACT

A tire changer including a base mounting a tabletop provided with wheel securing clamps. The tabletop is mounted on the base for movement between tire changing positions and a generally vertical wheel loading and unloading position. The tabletop is provided with a tire changing tool driving fixture and a tool is receivable in the fixture and includes a head for engaging a tire bead for changing positions and a tire support surface spaced from the tool head for suppporting a tire during the initial stages of a mounting operation eliminating any need for the operator of the changer to provide such support.

4 Claims, 8 Drawing Figures

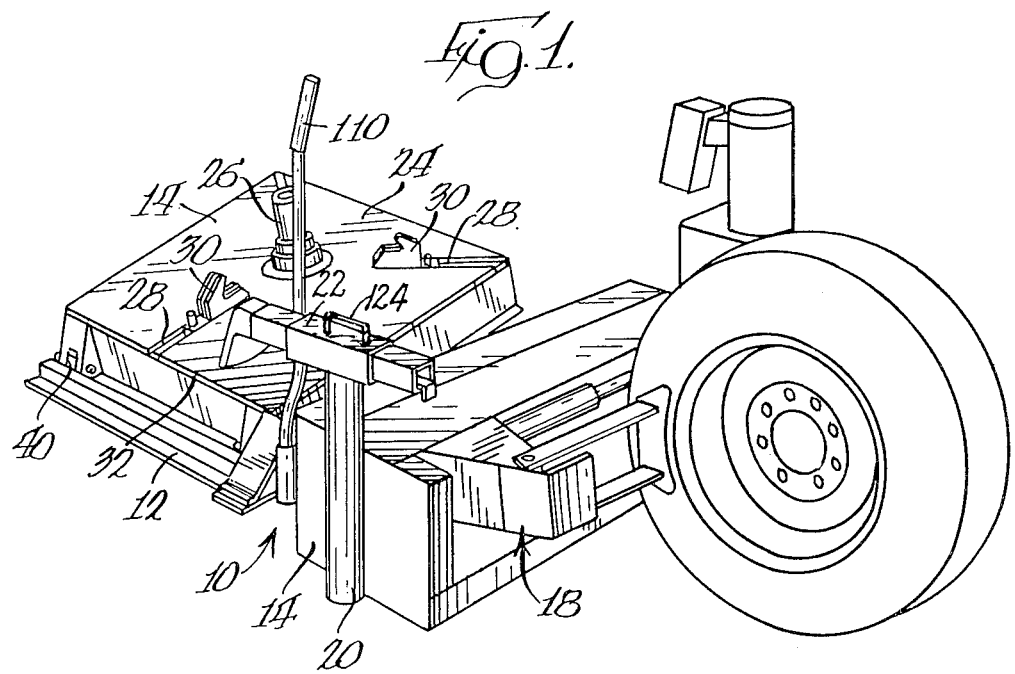

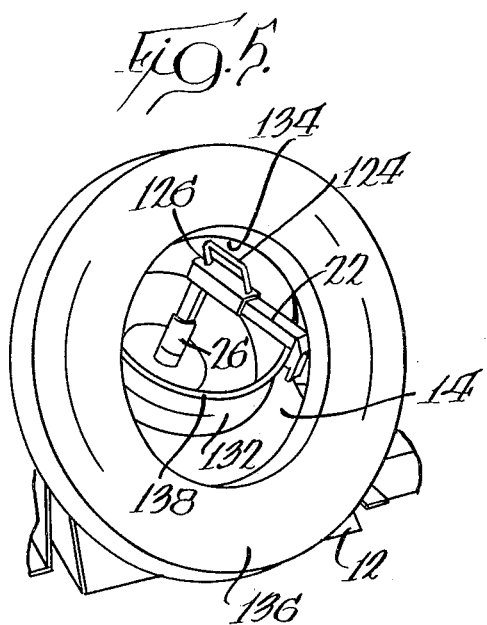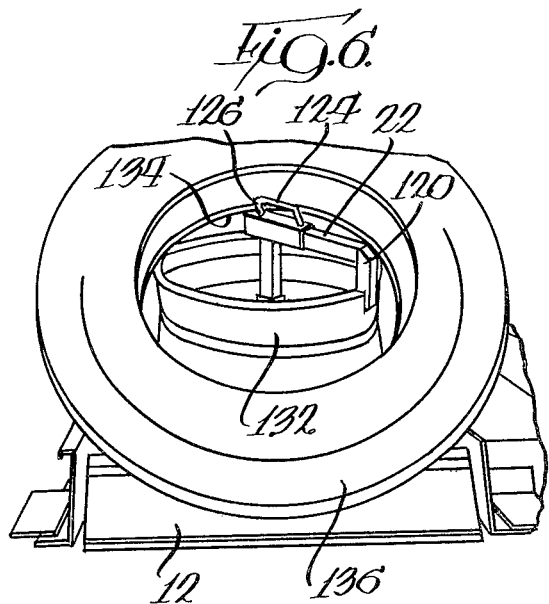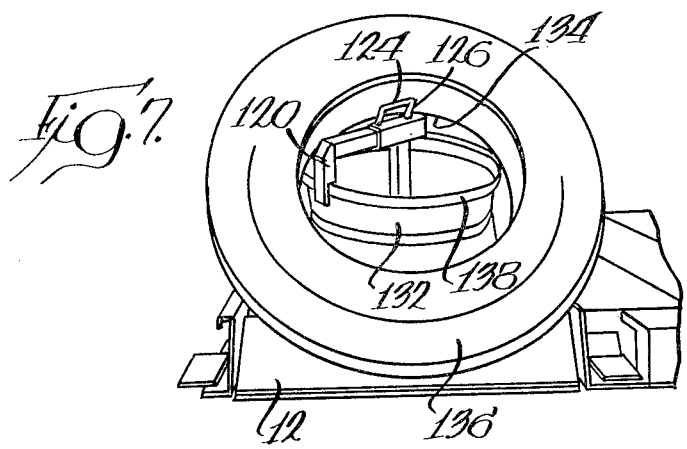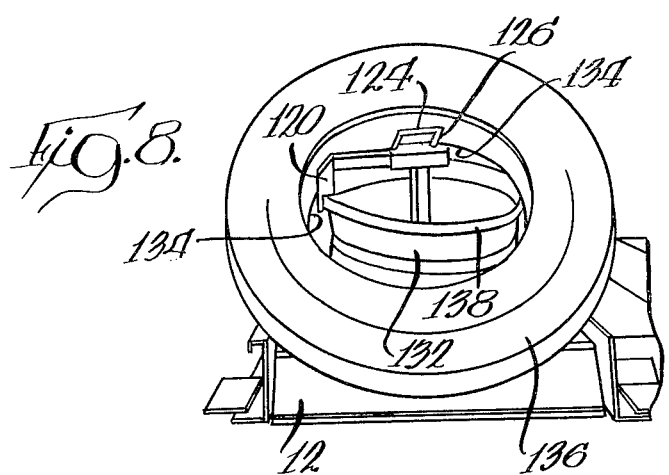

TIRE CHANGING APPARATUS

BACKGROUND OF THE INVENTION

This invention relates to a tire changing apparatus and more specifically, to a tire changing apparatus particularly suited for use in the changing of relatively heavy tire and wheel combinations as are typically found on trucks.

Many tire changing machines commonly in use today are quite adequate for their intended purpose when used in changing various wheel and tire combinations commonly employed in automobiles. Typically, they include a base mounting a tabletop or tire receiving surface in an elevated position, usually 30 or more inches above the underlying surface supporting the machine. However, wheel and tire combinations employed on a large variety of trucks may be considerably larger than those used with automobiles. Thus, even if the tire changing apparatus is capable of performing tire changing operations on the larger truck tires, the operator of the changer will be faced with considerable difficulty in elevating the wheel and tire combination sufficiently to place it on the tabletop for servicing purposes due to the considerably increased weight of the larger truck tire and wheel combinations.

As a consequence, the operator will be quickly fatigued and considerable inefficiency will enter into the changing process.

Thus, there is a real need for a tire changing apparatus which eliminates or otherwise minimizes the amount of physical effort required by an operator thereof and yet which still allows the servicing of tires of relatively large size in an efficient and expeditious manner.

SUMMARY OF THE INVENTION

It is the principal object of the invention to provide a new and improved tire changing apparatus. More specifically, it is an object of the invention to provide a tire changing apparatus which is capable of changing relatively large and heavy wheel and tire combinations with a minimum of physical effort required on the part of the operator.

According to one facet of the invention, there is provided a tire changer including a base having a lower extremity to support the base on an underlying surface. There is also provided a tabletop having a wheel securing means thereon. Means mount the tabletop on the base for pivotal movement about a generally horizontal axis between a generally horizontal, tire changing position, intermediate non-horizontal tire changing positions, and a generally vertical, wheel loading and unloading position whereat the securing means is in sufficiently close proximity to the underlying surface supporting the base so as to be engageable with and securable to an upright wheel and tire on the underlying surface. Means are provided for selectively pivoting the tabletop between the positions. The tabletop includes means for driving a tire changing tool relative to a wheel secured to the table and the tool is provided with not only a tire mounting and demounting head, but a tire support fixture remote from the head to support the tire against disassociation from a wheel clamped to the table during a tire mounting operation.

In a highly preferred embodiment, the tire support fixture is configured as a handle to provide the tire support function mentioned above and the additional function of providing a means for manipulating the tool.

As a consequence of the foregoing construction, a wheel and tire need only be rolled into proximity to the tabletop when in a vertical position, secured thereto and the tabletop pivoted to a desired tire changing position. The only effort required on the part of the operator is that of rolling the tire along the underlying surface to the location of the tire changer.

Other objects and advantages will become apparent from the following specification taken in connection with the accompanying drawings.

DESCRIPTION OF THE DRAWINGS

FIG. 1 is a persepctive view of a tire changing apparatus made according to the invention;

FIG. 2 is a somewhat schematic, elevational view of a tabletop employed in the invention;

FIG. 5 illustrates one configuration of the relative positions of tire changing components, a tire and a wheel as they would be at the initiation of a tire mounting operation;

FIG. 6 is a view similar to FIG. 5 but showing the components at a subsequent stage in a mounting operation;

FIG. 7 is a view similar to FIGS. 5 and 6 but illustrating the components at still a further subsequent stage in a mounting operation; and FIG. 8 is a view similar to that of FIGS. 5-7 but illustrating the components in subsequent positions whereat the actual mounting of the tire during a mounting operation is about to begin.

DESCRIPTION OF THE PREFERRED EMBODIMENT

Figure 3:
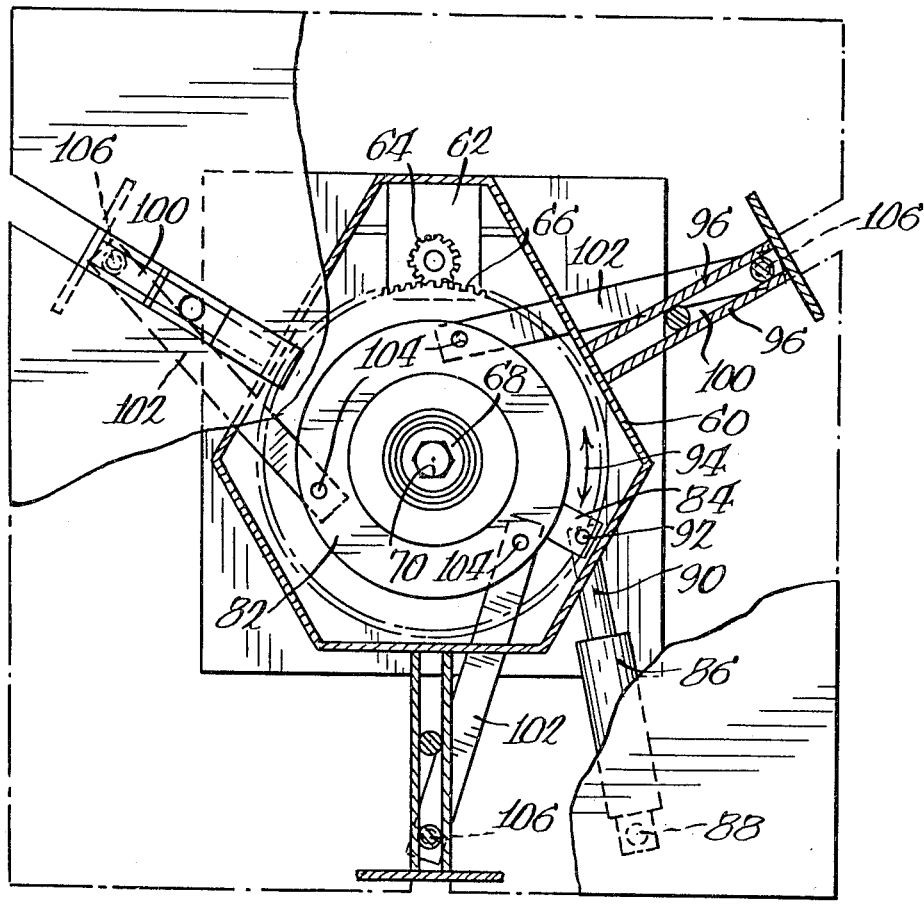
FIG. 3 is a plan view of the tabletop with parts broken away and other parts shown in section for clarity.

With reference to FIGS. 1 and 2, an exemplary embodiment of a tire changing apparatus made according to the invention is illustrated and is seen to include a base, generally designated 10, which is adapted to support the apparatus on an underlying surface such as a floor or the like. The base 10 includes a rectangular frame 12 of low profile and a somewhat higher housing 14. The low profile frame 12 mounts a tire changing table 16 while the housing part 14 of the base 10 mounts a bead loosening assembly, generally designated 18.

The assemblage also includes an upright, open-ended tube 20 which may receive a tire changing tool 22 when not in use for storage purposes.

The tabletop 14 includes a rectangular upper plate 24. Centrally, within the surface 24 is a tire tool receiving fixture 26 which can receive the tool 22 for purposes to be seen. Slots 28 at spaced locations in the plate 24 reciprocally guide tire securing clamps 30 toward and away from the fixture 26. In the preferred embodiment, there are three such clamps 30 each equally angularly spaced by about 120°.

One edge 32 of the plate 24 mounts a downwardly depending plate 34 (FIG. 2) which in turn mounts apertured tongues 36. Pivot pins 38 extend through the tongues 36 and corresponding lugs 40 (only one of which is shown in FIG. 1) on the frame 12 so as to mount the tabletop 14 for rotation about a generally horizontal axis.

As seen in FIG. 2, when the tabletop 14 is in a solid line position, it is disposed for a tire changing operation. When the tabletop 14 is shifted to the dotted line position in FIG. 2, it is in a wheel loading and unloading position. In actuality, either of the illustrated positions, as well as intermediate positions, may be employed during a mounting operation as desired by the operator.

To provide for such movement, a fluid cylinder 44 is pivotally connected at 46 to an appropriate part of the frame 12 and has its rod 48 pivotally connected by a pin 50 to the tabletop 14.

As also can be seen in FIG. 2, the grippers 30 have radially inwardly opening notches 52 for the purpose of gripping the exterior of the rim of a wheel. One of the slots 28 is located such that its corresponding gripper 30 moves in a path generally transverse to the edge 32 which is parallel to the horizontal axis defined by the pivot pins 38. Thus, with the tabletop 14 in its vertical position as shown in FIG. 2, the notch 52 of the associated rim clamp 30 will open upwardly. A wheel and tire, with the beads thereof previously loosened, may be rolled into proximity to the tabletop 14 such that the rim of the wheel overlies the notch 52. The grippers 30 may then be moved by means to be described hereinafter radially inwardly on the tabletop 14 and during such movement, the notch 52 on the lowermost gripper 30 will engage the rim of the wheel to elevate the wheel until such such time as the remaining clamps 30 engage the rim at which time the wheel will be centered on the tabletop 14 about the fixture 26. This feature of the invention eliminates any need for the operator of the tire changer to elevate a wheel and tire combination to place the same on the table. It will be appreciated that clamps of the type having radially outwardly opening notches or the like for engaging the inner surface of the wheel rim can be used in lieu of those illustrated. In such a case, the clamps will be initially located at their radially innermost position with respect to the fixture 26 and move radially outwardly. In such a case, the grippers corresponding to the uppermost grippers 30 shown in FIG. 2 would serve to elevate the tire and center the same with respect to the fixture 26.

Turning now to FIG. 3, a housing like frame structure 60 is secured to the undersurface of the plate 24 and mounts a bidirectional motor 62 having a rotary output mounting a gear 64. The motor 64 is operable in all tabletop positions to allow tire changing in any tabletop position. The gear 64 is engaged with a rather large gear 66 which in turn is suitably rotatably journalled by bearings not shown and which drives a bushing 68 having a hexagonal interior 70. The bushing 68 forms part of the tool receiving fixture 26 and a tire changing tool may be received within the opening 70 to be rotated upon energization of the motor 62.

A disk 82 is also suitably journalled beneath the plate 24 concentrically with the gear 66 and includes a radially outwardly directed tab 84. A cylinder 86 is pivoted as at 88 to the tabletop and its rod 90 is pivoted as at 92 to the tab 84. Thus, by extension or retraction of the rod 90 through the direction of fluid to the cylinder 86, the disk 82 can be bi-directionally rotated as indicated by an arrow 94.

Plate-like guides 96 are aligned with the slots 28 and guide blocks 100 on which the grippers 30 are suitably mounted as desired. Links 102 are pivoted at 104 to the disk 82 and at 106 to the blocks 100. Thus, and with reference to FIG. 3, when the disk 82 is rotated in a counterclockwise direction, the blocks 100 will be moved radially inwardly causing a corresponding movement of the grippers 30. Conversely, when the disk 82 is rotated in a clockwise direction, ultimately, the grippers 30 will be moved radially outwardly.

It will be observed that this arrangement provides for simultaneous movement of the grippers 30 in the same direction and at the same rate to provide the aforementioned centering action. The use of the cylinder 86 to drive the clamps 30 ensures that the previously mentioned lifting function thereof for loading purposes requires no more effort on the part of the operator than that required to operate a suitable control for the cylinder 86.

Returning to FIG. 1, a control handle 110 extends upwardly from one side of the frame 12 and may be employed to operate suitable valving for control of the cylinders 44 (FIG. 2) and 86 (FIG. 3). The particular means utilized form no part of the present invention but it is contemplated that fore and aft movement of the handle 110 relative to a neutral position can be utilized to control the cylinder 44 for moving the tabletop 14 between the two positions shown in FIG. 2. Leftward movement of the handle could be used, for example, to cause the clamps 30 to move radially outwardly while rightward movement of the handle 110 could be used to cause radially inwardly movement of the grippers 30.

Figure 4:
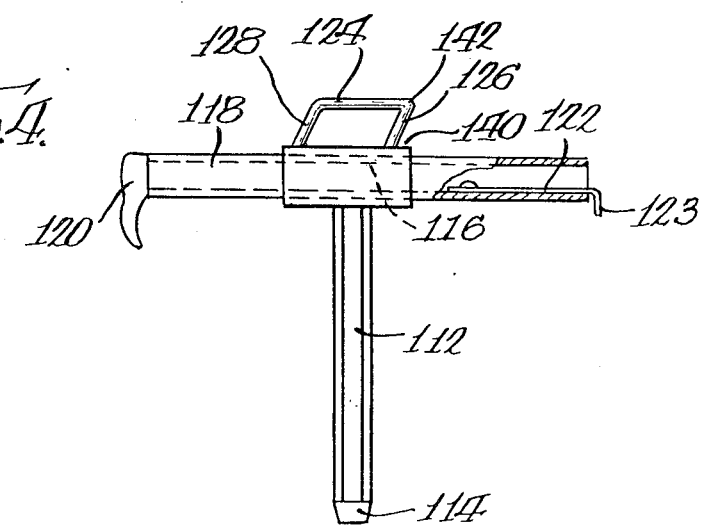
FIG. 4 is a view of a tire changing tool which may be used with the tire changer.

A typical tool to be used in conjunction with the fixture 26 is illustrated in FIG. 4 and includes a shaft 112 of hexagonal exterior configuration terminating in a bevel 114 for receipt within the bushing 68. The upper end of the shaft 112 is provided with a transversely extending sleeve 116 having a square internal cross-section to slidably receive a square tube 118. One end of the tube 118 mounts a tool head 120 which may be of any suitable configuration known in the art and which is enlarged sufficiently so as to be impassable through the sleeve 116.

The other end of the tube 118 mounts a spring finger 122 which extends exteriorly of the tube end 118 and which terminates in a tab 123 thereat. The tab 123 extends beyond the periphery of the tube 118 and is such as to normally engage the end of the sleeve 116 if it is attempted to remove the tube 118 therefrom. When removal is desired, the tab 123 may be moved upwardly as seen in FIG. 4 against the bias of the spring finger 122.

The tool 22 is completed by an inverted, U-shaped bail 124 secured as by welding to the upper surface of the sleeve 116 at the ends of its respective downturned legs 126 and 128. As can be seen in FIG. 4, the point at which the legs 126 and 128 join the sleeve 116 is spaced somewhat inwardly from the ends of the latter.

The bail 124 provides a dual function. The first is one of a handle whereby the tool 22 may be readily transported between its support tube 20 and the tool receiving and driving fixture 26 as required before, during and after a tire changing operation.

The second function provided by the bail 124 is one of a means for supporting a tire at initial stages of a mounting operation at a location spaced from the working head 120 of the tool 22 to prevent the tire from becoming disassociated from the wheel prior to and during rotation of the tool 22 during the mounting procedure. This function is performed by the leg 126 of the bail 124 most remote from the head 120. The manner in which such support is provided will now be described in connection with FIGS. 5-8, inclusive.

Referring first to FIG. 5, the tabletop 14 is illustrated in a partially lowered position with a wheel 132 clamped thereto in the manner previously described. The tool 22 is operatively disposed in the fixture 26 and extends from the rotational axis thereof in a position generally corresponding to a position between a 4 o'clock and 8 o'clock position. The leg 126 of the bail is below the upper portion of the remote tire bead 134 of a tire 136 that has been rolled into position for mounting purposes. The operator of the tire changer may allow the tire 136 to move toward the center of the tire changer such that the bead 134 overlies the leg 126 of the bail 124.

The tabletop 14 can then be lowered to a position such as illustrated in FIGS. 6 and 7 which would be the most desirable one of the variety of tire changing positions the table 14 can assume. During such lowering movement, the engagement of the leg 126 of the bail 124 with the bead 134 essentially hooks the tire 136 and elevates the tire off of the floor as the tabletop 14 is lowered.

The resulting configuration of components is shown in either FIGS. 6 or 7, there being no essential functional difference between the illustration shown in the two. In either case, the tire has been elevated off of the floor and is hanging on leg 126 of the bail 124.

The next step in the mounting operation is to effect rotation of the tool 22 from the position illustrated in FIGS. 6 and 7 or any intermediate position. This step is illustrated in FIG. 8. With the tool 22 at an approximate 9 o'clock position, the head 120 has engaged the bead 134 and is beginning to deflect the same down and about the upper rim 138 of the wheel 132. At this time, at a location remote from the head 120, the bead 134 remains in engagement with the leg 126 of the bail 124. If this engagement were not maintained, without a force exerted on the tire 136 manually by the operator of the apparatus, the tire 136 would pivot around the head 120 of the tool 22 and fall off of the left side of the tire changing apparatus for a clockwise rotation of the tool 22 as illustrated in FIG. 8. However, the leg 126 supports the tire 136 sufficiently until the head 120 of the tool 22 moves sufficiently toward the center of the tabletop 14, considered from right to left, so that the center of gravity of the tire is disposed on, or to the left of the center of the table 22 when considered from right to left as viewed in FIG. 8. With the center of gravity of the wheel 136 so disposed, the fact that the bead 134 is already below the rim 138 at the left side thereof as viewed in FIG. 8 and the tool head 120 is progressively moving to the right of the center of the table, considered from left to right, and deflecting an additional part of the bead 134 to a position below the rim 138 will prevent the tire 136 from merely being pushed by the tool 120 and falling off of the apparatus.

Like results are obtainable if the operator chooses to drive the tool head 120 in a counterclockwise direction rather than clockwise as described.

From the foregoing, it will be appreciated that the bail 124, though simple in construction, is of significant moment in terms of the functions provided thereby.

When the bail 124 is formed of a bent rod or the like, it will frequently be desirable that the leg 126 be not strictly vertically oriented, but inclined somewhat as viewed in FIG. 4 to provide a pocket 140 for receipt of the lower tire bead. This is due to the fact that bending of a rod to form the bail 124 will result in a generous round 142 at the intersection of the leg 126 with the bight of the bail 124. Without the pocket 140, for some orientations of the tabletop 14, it would be possible for the lower bead of a tire to slip on the round 142 and become disassociated from the bail 124.

The use of the bail 124 as a handle for manipulation of the tool is of course quite handy. But its function as a tire support device as provided by the leg 126 totally eliminates any need for an operator of the apparatus to provide a second point of support for the tire during the initial stages of a mounting operation. It eliminates the need for the operator to lift the tire to be mounted onto the table since this can be accomplished by engaging the tire with the leg 126 and lowering the table.

Of course, if a handle function is not desired or required, the latter two advantages could be obtained simply by providing a somewhat vertically oriented surface in lieu of the leg 126 to perform the same hooking and supporting functions. Alternately, structures other than bails, so long as provided with a vertical surface corresponding to that provided by the leg 126 and some grasping means could be utilized as combination handles and tire supports.

What is claimed is:

1. A tire changer comprising:
    a base having a lower extremity to support the base on an underlying surface;
    a table top having wheel securing means;
    means mounting said tabletop on said base for pivotal movement about a generally horizontal axis between tire changing positions and a generally vertical, wheel loading and unloading position whereat said securing means is in sufficiently close proximity to the underlying surface supporting the base so as to be engageable with and securable to an upright wheel and tire on the underlying surface;
    means for selectively pivoting said tabletop between said positions;
    means for driving a tire changing tool relative to said securing means, and thus a wheel secured thereby to said tabletop;
    and;
    an elongated drivable tool connectible to said driving means for mounting a tire on a wheel including a tool head and a tire bead support surface remote from said tool head, said tire support surface being defined by a handle on said tool.

2. The tire changer of claim 1 wherein said handle is a bail.

3. A tire changer comprising:
    a base having a lower extremity to support the base on an underlying surface;
    a tabletop having wheel securing means and tire mounting tool driving means;
    means mounting said tabletop on said base for movement between at least one tire changing position and a generally vertical wheel loading and unloading position;
    means for selectively moving said tabletop between said positions; and
    a mounting tool connected to said tool driving means for mounting a tire on a wheel including a tool head moving a tire bead over a wheel rim and a tire support surface being in sufficiently close proximity to the underlying surface supporting the base for at least some positions of said tabletop as to be engageable with a bead of a generally upright tire to carry the tire onto a wheel secured to said tabletop by said securing means as said tabletop is moved in a direction away from said generally vertical position, said tool driving means being rotatable and said tool including a sleeve connectable to said driving means, a shaft slidable within said sleeve and mounting said tool head, and wherein said support surface is disposed on said sleeve.

4. The tire changer of claim 3 wherein said support surface is defined by a bail-like handle secured to said sleeve.

* * * * *